United States Patent

Altemus

[15] 3,688,028

[45] Aug. 29, 1972

[54] BEAM INTENSITY COMPENSATOR

[72] Inventor: William C. Altemus, Littleton, Colo.

[73] Assignee: Computer Image Corporation, Denver, Colo.

[22] Filed: Sept. 23, 1970

[21] Appl. No.: 74,662

[52] U.S. Cl...........178/6.8, 178/DIG. 29, 178/7.5 D, 178/7.5 SE, 340/324 A

[51] Int. Cl.............................H04n 5/19, H04n 5/58

[58] Field of Search....178/7.7, 6.8, DIG. 29, 17.3 R, 178/7.3 D, 7.5 D, 7.5 SE; 340/324 A

[56] References Cited

UNITED STATES PATENTS

| | | | |
|---|---|---|---|
| 3,333,147 | 7/1967 | Henderson | 315/22 |
| 2,510,670 | 6/1950 | Trott | 178/7.5 R |
| 3,325,803 | 6/1967 | Carlock et al. | 315/18 |
| 3,335,315 | 8/1967 | Moore | 315/18 |

*Primary Examiner*—Robert L. Griffin
*Assistant Examiner*—Richard K. Eckert, Jr.
*Attorney*—Rogers, Ezell, Eilers & Robbins

[57] ABSTRACT

A system for automatically controlling the beam intensity of a display cathode ray tube to generate an image of constant brightness despite variances in the size of the image or scanning velocity of the spot produced by the electron beam, including means for generating a beam intensity control voltage comprised of signals which are functions of the size of the image and/or the scan velocity of the spot.

30 Claims, 1 Drawing Figure

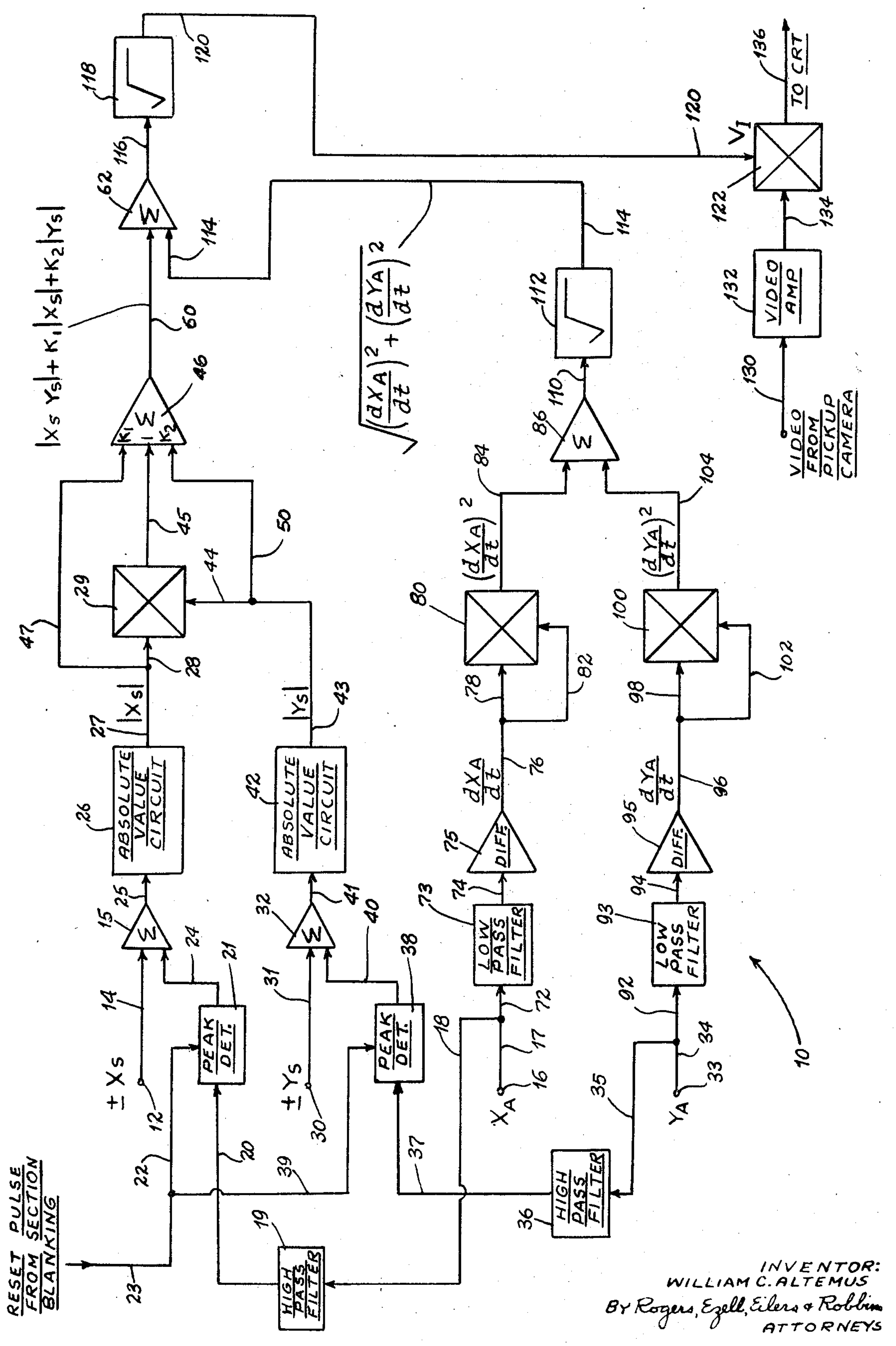
INVENTOR:
WILLIAM C. ALTEMUS
BY Rogers, Ezell, Eilers & Robbins
ATTORNEYS

BEAM INTENSITY COMPENSATOR

BACKGROUND OF THE INVENTION

In producing animated images on a cathode ray tube screen as, for example, described in Lee Harrison, et al, patent application Ser. No. 882,125, entitled "Computer Animation Generating System," a TV raster of variable size, position, and aspect ratio, or a spot moving in a pattern determined by the X and Y animation oscillators, or combinations of these modes is used. It has been found that the brightness of the image decreases as the size of the animated image and/or the scan velocity of the spot increases. This occurs because as the raster increases in size in the direction perpendicular to the raster lines, the raster lines become farther apart, producing less overlap and a decrease in brightness, while as the size increases in the direction of the raster lines, the energy of the moving beam is spread over a larger area, and less light-per-unit-area or brightness is produced, even though the total light energy over the raster may remain constant. When only a moving spot with no raster is present on the screen, the image brightness decreases with increasing scan velocity as long as the animation oscillator frequencies are low compared to the frame rate. This is because there is less time to excite the phosphor at a given spot on the screen as the velocity of the spot increases, producing a decrease in brightness. When the animation oscillator frequencies are higher than the frame rate, the image brightness is relatively independent of the instantaneous spot velocity because the many cycles of deflection are integrated over the frame time interval. In this case, the brightness of the image decreases as the amplitude or size of the X and Y animation oscillator deflections increases, in the same manner as the effect of the raster sizes. Therefore, to generate an image of constant brightness it is necessary to compensate for changes in size and velocity by changing the intensity of the beam of the CRT accordingly. This invention provides such compensation.

SUMMARY OF THE INVENTION

The system of this invention includes means for combining X and Y coordinate size voltages to generate a signal which is a function of the size of an image displayed on a CRT, whether the image is a two-dimensional raster, a Lissajous' pattern created by the animation oscillators, or merely consists of lines in the X or Y direction. Means are also provided for generating a signal proportional to the velocity of the spot on the screen. The size and velocity signals are combined with the intensity control voltage from a video camera and applied to the control grid voltage input of the CRT.

DESCRIPTION OF THE DRAWING

The drawing is a schematic diagram of the invention.

DETAILED DESCRIPTION OF THE PREFERRED EMBODIMENT

In the drawing there is shown the intensity compensation network 10 of this invention. The purpose of this invention is to provide a means for automatically maintaining a constant brightness of an image produced on a cathode ray tube despite variances in the velocity of the spot or the size of the image produced thereby. With this network the intensity of the beam is increased to compensate for an increase in the size of the figure whether or not displayed on a raster and an increase in the velocity of the spot.

A signal 12, representing the X coordinate voltage for size of the raster on which the figure is displayed at a given instant of time, and which for example, is generated at the output of the multiplier 98 of FIG. 4 of the above referenced copending application, is fed through a conductor 14 to a first input of a summation amplifier 15. A signal 16, representing the X coordinate animation signal of the figure being drawn at a given instant of time, and which, for example, is generated at the output of the multiplier 34 of FIG. 4 of the above referenced co-pending application, is fed through a conductor 17, a conductor 18, a high-pass filter 19, and a conductor 20 to the input of a peak detector 21. The high-pass filter 19 is such as to pass animation signal frequencies higher than the frame frequency of the display. For example, where the display is to be recorded on film, the filter cut-off frequency should be approximately 48 Hz. and where the display is to be recorded on video tape, the filter cut-off frequency should be approximately 60 Hz. A conductor 22 and a conductor 23 feed the reset pulses from a blanking circuit (not shown) to the reset input of the peak detector 21. This blanking circuit is like the blanking circuit 385 of FIG. 4 of the above referenced co-pending application. In the co-pending application, means are provided for sectioning the raster with selected parts of the animated image displayed on each section. The sizes of the animation signals may vary greatly between sections. A conductor 384 (also shown in FIG. 4 of the referenced co-pending application) carries a reset pulse to the blanking circuit 385 to cause the blanking circuit 385 to blank the CRT beam as it moves between raster sections. Because the sizes of the animation signals may vary greatly between raster sections, this same reset pulse is used to reset the peak detector 21 to allow a rapid change in the size measurement between raster sections. Where the raster has only one section, the peak detector 21 is reset, each raster frame to measure the peak amplitude or size of the animation signals for each frame.

The output signal of the peak detector 21 representing the peak measurement for the X coordinate size of the animation signals for each raster section, or frame where there is only one section, for animation signal frequencies above frame frequency, is fed through a conductor 24 to a second input of the summation amplifier 15. The output signal from the summation amplifier 15, representing the X coordinate voltage for size of the raster and the animation signals is fed through a conductor 25 to the input of an absolute value circuit 26. The circuit 26 takes the absolute value of the signal on the conductor 25 which could be either a positive or negative signal. Since it is the absolute size of the figure that determines the brightness of the image, only the absolute value is used. The absolute value of the X coordinate size signal is fed through a conductor 27 and a conductor 28 to one input of a multiplier 29.

A signal 30 representing the Y coordinate voltage for size of the raster on which the figure is displayed at a given instant of time, and which, for example, is generated at the output of the multiplier 108 of FIG. 4 of the above-referenced co-pending application, is fed through a conductor 31 to a first input of a summation amplifier 32. A signal 33, representing the Y coordinate animation signal of the figure being drawn at a given instant of time and which, for example, is generated at the output of the multiplier 45 of FIG. 4 of the above-referenced co-pending application, is fed through a conductor 34, a conductor 35, a high-pass filter 36, and a conductor 37 to the input of a peak detector 38. A conductor 39 and the conductor 23 feed the reset pulses from the blanking circuit, like the blanking circuit 385 shown in FIG. 4 of the above-referenced co-pending application, to the reset input of the peak detector 38. The purpose for these reset pulses has been heretofore described in connection with the operation of the peak detector 21. The high-pass filter 36 and peak detector 38 operate in the same manner and for the same reasons as heretofore described in connection with the operation of the high-pass filter 19 and the peak detector 21.

The output of the peak detector 38 representing the peak measurement for the Y coordinate size of the animation signals for each raster section, or frame where there is only one section, for animation signal frequencies above frame frequency, is fed through a conductor 40 to a second input of the summation amplifier 32. The output signal from the summation amplifier 32, representing the Y coordinate voltage for size of the raster and animation signals is fed through a conductor 41 to the input of an absolute value circuit 42. The absolute value circuit 42 is identical to, and serves the same function as, the absolute value circuit 26. The output of the circuit 42 representing the absolute value of the Y coordinate size signal is fed through a conductor 43, and a conductor 44 to another input to the multiplier 29. The multiplier 29 multiplies the signals at its two inputs to produce at its output the absolute value of the product of the X coordinate size signal and Y coordinate size signal. This output signal is fed through a conductor 45 to one input of a weighted summation amplifier 46, which input has a weight of unity. The absolute value of the X coordinate size signal on the conductor 27 is also fed through a conductor 47 to a second input to the weighted summation amplifier 46, which input has the weight of a constant $K_1$. The absolute value of the Y coordinate size signal on the conductor 43 is also fed through a conductor 50 to a third input of the weighted summation amplifier 46, which input has the weight of a constant $K_2$. The output of the summation amplifier 46 representing $|X_S Y_S| + K_1 |X_S| + K_2 |Y_S|$ is fed through a conductor 60 to one input of a summation amplifier 62.

Referring to the signal on the conductor 60, the term $|X_S Y_S|$ represents the product of the X coordinate size signal and Y coordinate size signal for the image being produced at a given instant of time on the CRT. As the size of the image increases, the product $X_S Y_S$ increases accordingly. The term $K_1|X_S|$ represents the X coordinate size voltage multiplied by a constant $K_1$, and the term $K_2|Y_S|$ represents the Y coordinate size voltage multiplied by a constant $K_2$. These terms are required to produce intensity compensation when the image is merely a line, for where this occurs, the term $X_S Y_S$ is Zero, which would, with the $K_1|X_S|$ and $K_2|Y_S|$ terms, blank the image. Hence, if the figure is a line in the X direction, the term $K_1|X_S|$ has a value which increases as the length of the line increases, and where the figure is a line in the Y direction, the term $K_2|Y_S|$ has a value which increases as the length of the line increases. The constants $K_1$ and $K_2$ are chosen so that the terms $K_1|X_S|$ and $K_2|Y_S|$ are relatively small where the figure is more than just a line, in comparison with the term $|X_S Y_S|$.

To compensate the intensity for movement or animation of the image, which is really compensation for a change in the velocity of the spot as it produces animation on the screen of the CRT, the signal 16, is fed through the conductor 17 and a conductor 72 to the input of a low-pass filter 73. Spot velocity noticeably affects image brightness only at animation signal frequencies below the frame frequency of the display. Therefore, the low-pass filter is used to pass only those frequencies below frame frequency, otherwise there would be over-compensation at the higher frequencies. Where the display is to be recorded on film, the filter cutoff frequency should be approximately 48 Hz., and where the display is to be recorded on video tape, the filter cutoff frequency should be approximately 60 Hz. The output signal from the filter 73 is fed through a conductor 74 to the input of a differentiator 75. The output of the differentiator 75 representing $dX_A/dt$, is fed through a conductor 76 and a conductor 78 to an input of a multiplier 80. The signal on the conductor 76 is also fed through a conductor 82 to another input of the multiplier 80. When connected as shown, the multiplier 80 acts as a squaring network with its output representing $(dX_A/dt)^2$ . This output signal is fed through a conductor 84 to an input to a summation amplifier 86.

The signal 33 representing the Y coordinate animation signal for the figure being drawn at a given instant of time is fed through the conductor 34 and a conductor 92 to the input of a low-pass filter 93 which operates in the same manner and for the same reasons as the low-pass filter 73 to pass only those frequencies below frame frequency. The output signal from the filter 93 is fed through a conductor 94 to the input of a differentiator 95. The output of the differentiator 95, representing $dY_A/dt$, is fed through a conductor 96 and a conductor 98 to an input of a multiplier 100. The signal on the conductor 96 is also fed through a conductor 102 to another input of the multiplier 100. The multiplier 100 is identical to, and performs the same function as, the multiplier 80, producing at its output a signal representing $(dY_A/dt)^2$ which is fed through a conductor 104 to another input of the summation amplifier 86. The output of the summation amplifier 86 representing $(dX_A/dt)^2 + (dY_A/dt)^2$ is fed through a conductor 110 to the input of a square root network 112. The output of the square root network 112 representing $\sqrt{(dX_A/dt)^2 + (dY_A/dt)^2}$ is fed through a conductor 114 to another input of the summation amplifier 62. The reason for the square root network 112 is that the resultant scan velocity of the spot is, by the Pythegorean Theorum, equal to the square root of the sum of the squares of the X coordinate and Y coordinate velocity components.

The output of the summation amplifier 62, representing the sum of the size and animation signals for the figure being drawn is fed through a conductor 116 to the input of a square root network 118. Because the intensity of the beam of a CRT is proportional to the square of the control grid voltage, it is necessary to take the square root of the signal on the conductor 116. The output of the square root network 118 is fed through a conductor 120 to one input of a multiplier 122. The video signal from a video pickup camera, such as, for example, the video camera 253 of FIG. 1 of the above-referenced co-pending application, is fed through a conductor 130 to the input of a video amplifier 132, the output of which is fed through a conductor 134 to another input of the multiplier 122 where it is multiplied by the signal on the conductor 120. The output of the multiplier 122 which represents the amplified video signal from the video pickup camera multiplied by a signal corresponding to the absolute size of the image in XY coordinates and the velocity of the spot is fed through a conductor 136 to the control grid input of a CRT.

The operation of the network is self-evident from the above description. As the size of the image produced on the CRT increases, whether due to increases in the size of the raster and/or amplitude of the animation signals, the signal on the conductor 60 representing $|X_S Y_S| + K_1 |X_S| +_2 |Y_S|$ increases accordingly, and as the scan velocity of the spot of the CRT increases, the signal on the conductor 114 representing $$\sqrt{(dX_A/dt)^2 + (dY_A/dt)^2}$$

increases accordingly. After these signals are added by the summation amplifier 62 and the square root of the added signals taken by the square root network 118, the resultant signal on the conductor 120 is multiplied by the video signal from the video camera and used to control the intensity of the CRT beam. If only the video signal from the video camera were used, the beam intensity of the CRT would remain constant irrespective of changes in image size and spot velocity producing modulations in image brightness. But, by multiplying the video signal by the signal on the conductor 120, a change in image size and/or spot velocity produces a corresponding change in beam intensity resulting in an image of constant brightness. Thus, a system has been described that will automatically adjust the intensity of the CRT beam to maintain a constant image brightness regardless of image size or spot velocity.

Various changes and modifications may be made within the invention as will be readily apparent to those skilled in the art. Such changes and modifications are within the scope and teaching of this invention as defined by the claims appended hereto.

What Is Claimed Is:

1. A method of maintaining an image of constant brightness on a display tube regardless of the size of the image or the scanning velocity of the spot comprising the steps of generating a signal representing the X coordinate size of the displayed image, generating a signal representing the Y coordinate size of the displayed image, generating a first signal from a combination of the X and Y coordinate signals, generating a second signal directly proportional to the scan velocity of the spot, combining the first and second signals with the video signal from a video pickup camera to produce an intensity signal, and applying the intensity signal to control the intensity of the beam of the display tube.

2. The method of claim 1 wherein the step of generating the first signal includes the steps of generating a signal representing the product of the X coordinate size voltage and the Y coordinate size voltage, generating a signal representing the product of the X coordinate size voltage and a first constant, generating a signal representing the product of the Y coordinate size voltage and a second constant, and adding these three signals to produce the first signal.

3. The method of claim 1 wherein the step of generating the second signal includes the steps of adding vectorially an X coordinate velocity signal and a Y coordinate velocity signal to produce a resultant velocity signal representing the second signal.

4. The method of claim 3 including the step of differentiating the X coordinate velocity signal, squaring the differentiated X coordinate velocity signal, differentiating the Y coordinate velocity signal, squaring the differentiated Y coordinate velocity signal, adding the squared signals, and taking the square root of the sum of the squared signals to produce the second signal.

5. The method of claim 1 wherein the combining step includes adding the first and second signals to produce a third signal, and combining the third signal with the video signal.

6. The method of claim 5 including the step of taking the square root of the third signal to produce a fourth signal, and combining the fourth signal with the video signal from the video camera to control the intensity of the beam of the display tube.

7. The method of claim 5 wherein the combining step includes multiplying the third signal by the video signal.

8. The method of claim 1 including the step of multiplying the absolute value of the X coordinate size signal with the absolute value of the Y coordinate size signal to generate the first signal.

9. A method of maintaining an image of constant brightness on a display tube regardless of the size of the image comprising the steps of generating a signal representing the product of an X coordinate size voltage and a Y coordinate size voltage, generating a signal representing the product of the X coordinate size voltage and a first constant, generating a signal representing the product of the Y coordinate size voltage and a second constant, adding these signals to produce a size compensation signal, and combining the compensation signal with the beam signal of the display tube to control the intensity of the beam.

10. A method of producing an animated display on a display tube including the generation of animation signals, and of compensating the brightness of the display for variations in the size of the image comprising the steps of generating signals representing the size of the raster on which the image is displayed, generating signals representing the amplitudes of the animation signals, combining these signals to produce a resultant signal directly proportional to the size of the displayed image, combining the resultant signal with a video signal from a video pickup camera to produce an intensity signal, and applying the intensity signal to control the intensity of the beam of the display tube.

11. In a system for producing an animated display on a display tube from a piece of art work photographed by a video camera, a system for compensating the brightness of the display for variations in the size of the image and the scan velocity of the display tube spot comprising means for generating a signal representing the X coordinate size of the displayed image, means for generating a signal representing the Y coordinate size of the displayed image, means for generating a first signal from a combination of the X and Y coordinate signals, means for generating a second signal directly proportional to the scan velocity of the spot and means for combining the first and second signals with the video signal from the video camera photographing the art work to produce an intensity signal, and means for applying the intensity signal to control the intensity of the beam of the display tube whereby the brightness of the image remains constant as the size of the displayed image and velocity of the beam increases or decreases.

12. The system of claim 11 wherein the means for generating the first signal includes means for generating a signal representing the product of the X coordinate size voltage and the Y coordinate size voltage, means for generating a signal representing the product of the X coordinate size voltage and a first constant, means for generating a signal representing the product of the Y coordinate size voltage and a second constant, and means for adding these three signals to produce the first signal.

13. The system of claim 11 wherein the means for generating the second signal includes means for adding vectorially an X coordinate velocity signal and a Y coordinate velocity signal to produce a resultant velocity signal representing the second signal.

14. The system of claim 13 including means for differentiating the X coordinate velocity signal, means for squaring the differentiated X coordinate velocity signal, means for differentiating the Y coordinate velocity signal, means for squaring the differentiated Y coordinate velocity signal, means for adding the squared signals, and means for taking the square root of the sum of the squared signals to produce the second signal.

15. The system of claim 11 wherein the combining means includes means for adding the first and second signals to produce a third signal, and means for combining the third signal with the video signal.

16. The method of claim 15 including means for taking the square root of the third signal to produce a fourth signal, and means for combining the fourth signal with the video signal.

17. The system of claim 15 wherein the last named combining means includes means for multiplying the third signal by the video signal.

18. The system of claim 11 including means for multiplying the absolute value of the X coordinate size signal with the absolute value of the Y coordinate size signal to generate the first signal.

19. In a system for producing an animating display on a CRT from a piece of art work photographed by a video camera, a system for compensating the brightness of the image for variations in image size and scan velocity comprising means for generating a signal representing the product of an X coordinate size voltage and a Y coordinate size voltage, means for generating a signal representing the product of the X coordinate size voltage and a first constant, means for generating a signal representing the product of the Y coordinate size voltage and a second constant, means for adding these three signals to produce a first signal, means for adding vectorially an X coordinate velocity signal and a Y coordinate velocity signal to produce a resultant velocity signal representing a second signal, means for adding the first and second signals to produce a third signal, and means for combining the third signal with the video signal from the video camera to produce a beam signal for controlling the intensity of the CRT beam.

20. The system of claim 19 wherein the combining means include means for multiplying the third signal by the video signal from the video camera to produce a beam signal for controlling the intensity of the CRT beam.

21. The system of claim 19 including means for taking the square root of the third signal to produce a fourth signal, and means for multiplying the fourth signal by the video signal from the video camera to produce a beam signal for controlling the intensity of the CRT beam.

22. A method of producing an animated display on a display tube including the generation of animation signals, and of compensating the brightness of the display for variations in the size of the image and the scan velocity of the display tube spot comprising the steps of generating signals representing the size of the raster on which the image is displayed, generating signals representing the amplitudes of the animation signals, combining these signals to produce a first signal directly proportional to the size of the displayed image, generating a second signal directly proportional to the scan velocity of the spot, combining the first and second signals with a video signal from a video pickup camera to produce an intensity signal, and applying the intensity signal to control the intensity of the beam of the display tube.

23. The method of claim 22 wherein the step of generating signals representing the size of the raster further comprises the steps of generating a signal representing the X coordinate size of the raster on which the image is displayed, and generating a signal representing the Y coordinate size of the raster on which the image is displayed, and the step of generating signals representing the amplitudes of the animation signals further comprises the steps of generating a signal representing the X coordinate amplitude of the animation signal, and generating a signal representing the Y coordinate amplitude of the animation signal, and combining these X and Y coordinate signals to produce the first signal.

24. The method of claim 23 wherein the last named combining step includes adding the signal representing the X coordinate size of the raster to the signal representing the X coordinate amplitude of the animation signal to produce a X coordinate size signal, and adding the signal representing the Y coordinate size of the raster to the signal representing the Y coordinate amplitude of the animation signal to produce a coordinate size and multiplying the X coordinate size signal by the Y coordinate size signal to produce the first signal.

25. A system for producing an animated image on a display tube including means for generating animation signals, and for compensating the brightness of the display for variations in the size of the image and the scan velocity of the display tube spot comprising means for generating signals representing the size of the raster on which the image is displayed, means for generating signals representing the amplitudes of the animation signals, the signals representing the amplitudes of the animation signals being of only those frequencies above the approximate frame frequency of the display, means for combining these signals to produce a first signal directly proportional to the size of the displayed image, means for generating a second signal directly proportional to the scan velocity of the spot, and means for combining the first and second signals with the video signal from a video pickup camera to produce an intensity signal, and means for applying the intensity signal to control the intensity of the beam of the display tube.

26. The system of claim 25 including means for generating DC signals representing the size of the animation signals during a selected time interval, and means for combining the DC signals with the signals representing the size of the raster to produce the first signal.

27. The system of claim 26 wherein the time interval is selected to be no greater than the period of each frame.

28. The system of claim 27 including means for detecting the peak amplitudes of the animation signals during each time interval, and wherein the DC signals are the signals representing the peak amplitudes of the animation signals.

29. The system of claim 25 wherein the second signal includes only those frequencies below the approximate frame frequency of the display.

30. The system of claim 29 wherein the means for generating the second signal further includes means for adding vectorially an X coordinate velocity signal and a Y coordinate velocity signal to produce a resultant velocity signal representing the second signal.

* * * * *